UNITED STATES PATENT OFFICE.

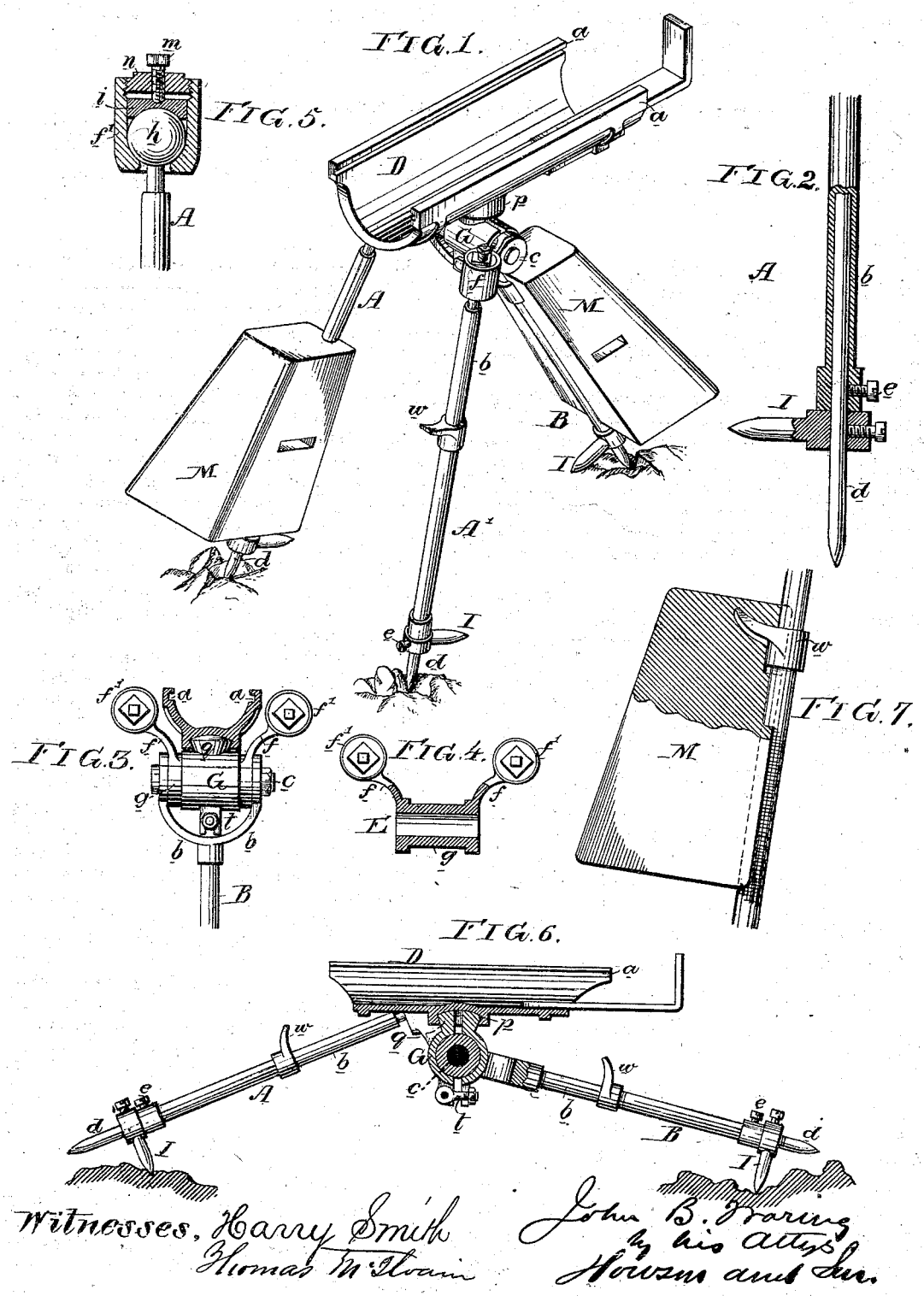

JOHN B. WARING, OF NEW YORK, N. Y., ASSIGNOR TO THE WARING ROCK-DRILL COMPANY.

IMPROVEMENT IN TRIPODS FOR ROCK-DRILLING MACHINES.

Specification forming part of Letters Patent No. 152,712, dated June 30, 1874; application filed January 20, 1874.

*To all whom it may concern:*

Be it known that I, JOHN B. WARING, of the city, county, and State of New York, have invented an Improved Tripod for Rock-Drilling Machines, of which the following is a specification:

My invention relates to tripods used for supporting rock-drilling machines; and the object of my invention is to so construct a tripod that it can be readily adjusted to and retained in any position which the direction of the hole to be drilled may suggest, an especial feature of the invention being the ready adjustment of the legs to such cavities in the rock as may present themselves.

Figure 1 in the accompanying drawing represents a perspective view of my improved tripod, A, A′, and B being the three legs for supporting the frame or shell D, which is, in the present instance, of a semi-cylindrical form, and which has guides or ways $a$ $a$, for receiving projections on the cylinder of the rock-drilling machine, the latter forming no part of my present invention. Each leg of the tripod consists of an external tube, $b$, of wrought-iron, and an internal rod, $d$, so fitted to the tube that it can be turned freely, and adjusted longitudinally therein, and secured after adjustment by a set-screw, $e$, passing through a collar or enlargement at the lower end of the tube, all as shown in the enlarged sectional view, Fig. 2.

The forked upper end $b$ of the rear leg B is adapted to a bolt, $c$, which passes through the cylindrical portion of the frame E, (see Figs. 3 and 4,) the said frame forming the top of the tripod, and having two arms, $f$, to each of which one of the front legs is connected, in the manner best observed in the sectional view, Fig. 5, in which $f'$ represents a socket formed on the end of each arm, and adapted to a sphere, $h$, formed on or attached to the upper end of the leg A, the sphere being confined to its place by a follower, $i$, acted on by a screw, $m$, which passes through a plate, $n$, screwed into the said socket. It will thus be seen that each front leg is connected to the frame E by a ball-and-socket joint, which permits the leg to be moved in any direction, the joint being readily made permanent after adjustment by the screw $m$. The shell D is connected to the frame E of the tripod in the manner best observed in the sectional views, Figs. 3 and 6. A circular recess, $p$, with an undercut edge, is formed in the under side of the shell, and to this recess is adapted a circular projection, $q$, having a beveled edge adapted to the undercut edge of the projection, one half of the projection being formed on one portion, and the other on the other portion, of clamps G, which are arranged to embrace the cylindrical portion $g$ of the above-mentioned frame E, the two portions of the clamp being connected together by a bolt, $t$, hinged to a lip on one portion, and adapted to a slot in the lip of another portion, in a manner too clearly shown in Fig. 6 to need explanation.

The tightening of the nut of the bolt $t$ expands the beveled projection $q$ of the clamps against the undercut edges of the recess $p$, and thus secures the shell D to the frame E of the tripod, and the loosening of the nut of the bolt permits such a contraction of the beveled projection $q$ that it can be withdrawn from the said recess; or the clamps can be so loosened as to permit the shell D to be turned laterally to any desired position without detaching it from the tripod, after which adjustment the shell may be secured by simply tightening the clamps in the manner described.

The main feature of my invention, however, is the attachment of the front legs of the tripod to its frame by means of ball-and-socket joints, for these joints permit the ready adjustment of the lower pointed ends of the legs to any cavity in the rock which may be present, to afford a secure lodgment for the said pointed ends of the legs. After the tripod, for instance, has been placed in the position determined by the direction in which the hole has to be bored, it may be found that one of the legs has not a secure lodgment, in which case it may be adjusted to any neighboring cavity without any change in the position of the shell D, for the leg may be elongated or contracted in accordance with its position, as determined by the cavity. This adjustment of the tripod may be in a measure effected by connecting one of its legs only to the frame with a ball-and-socket joint, or all the legs may be thus connected to the frame; but I have found it best in practice to confine these joints to the two front legs, as shown in the drawing, and as described above. In many cases it is necessary to so adjust a rock-drill that it will bore holes near the ground; hence I provide the adjustable rod $d$ of each leg with an adjustable spur, I, so that the legs may be outstretched to permit the depression of the shell D, as shown in Fig. 6, in which case the said spurs are adjusted to cavities in the rock, as shown.

It is necessary, when the rock-drill is in operation, that the tripod should be weighted, for which purpose I furnish each leg with a hooked projection, $w$, adapted to a recess in a weight, M, as shown in Fig. 7, the said weight having a groove for receiving, and being steadied laterally by, the leg, from which the weight can be readily detached.

It will be seen without further description that the shell D, and consequently the drilling-machine attached to it, can be vibrated freely on the cylindrical portion E of the frame F, and can be turned laterally on the beveled projection $q$ of the clamps G, while the legs afford ample opportunities for the vertical adjustment of the shell D.

I claim as my invention—

1. A drill-supporting tripod, two legs of which are connected to the tripod-frame by ball-and-socket joints, and the third by an ordinary joint, as herein set forth.

2. The combination of the undercut recess or socket $p$ on the under side of a shell or frame, D, for supporting the drilling-machine with the clamps G, the beveled projections $q$, and the cylindrical portion $c$ of the frame E.

3. The top E of the tripod, having arms $f$, for connection to the legs A and A' by ball-and-socket joints, and a cylindrical portion, $c$, adapted to the forked end of the leg B, all substantially as set forth.

4. The combination, with the adjustable rods $d$, of the legs, with spurs I, as and for the purpose specified.

5. The weight M, having a recess and groove adapted to the leg $t$ of the tripod, and to a hook, $u$, on the leg, as described, for the purpose specified.

In testimony whereof I have signed my name to this specification in the presence of two subscribing witnesses.

JOHN B. WARING.

Witnesses:
  HENRY D. GREEN,
  FRANK M. CAILLE.